Sept. 3, 1946.  J. E. KOSTUR  2,407,019
CLUTCH
Filed June 17, 1943
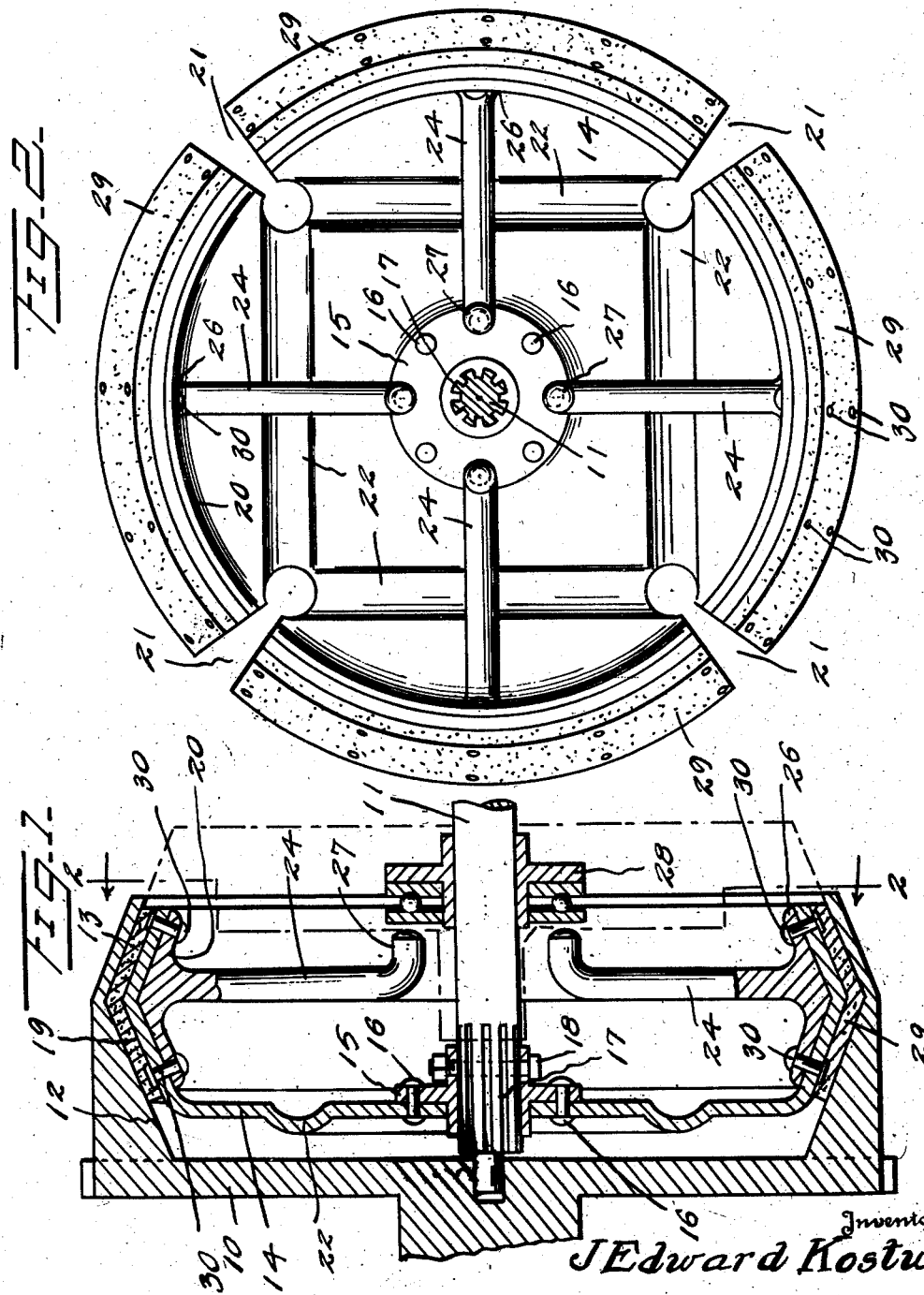
Inventor
J Edward Kostur
by L. F. Laudreth
Attorney Patented Sept. 3, 1946

2,407,019

UNITED STATES PATENT OFFICE 2,407,019

CLUTCH

J. Edward Kostur, Amarillo, Tex.

Application June 17, 1943, Serial No. 491,201

4 Claims. (Cl. 192—75)

This invention relates to a clutch assembly primarily but not necessarily adapted for use in motor vehicles.

It is aimed to provide a novel clutch unit approximately as a single body with as many parts made integral as practicable and especially one which avoids movable parts subject to great wear other than the lining, springs, bolts, collars, pins, and the like, and one which will not require adjustment.

Various additional objects and advantages will become apparent from a consideration of the description following taken in connection with accompanying drawing illustrating an operative embodiment.

In said drawing:

Figure 1 is a diametric view primarily in section illustrating the improved clutch assembly; and Figure 2 is a view practically in elevation of the clutch alone taken on the plane of line 2—2 of Figure 1, the flywheel being omitted for clearness.

Referring specifically to the drawing wherein like reference characters designate like or similar parts, 10 designates a flywheel of a propelling internal combustion engine of an automobile or self-propelled vehicle, and 11 designates the clutch shaft. The inner surface of the flywheel 10 has annular portions 12 and 13, at opposite angles so as to provide a channel of V-shape.

Associated with the flywheel and located interiorly thereof is a clutch member or plate generally designated 14 such plate being connected to a hub member 15 as by means of rivets 16, and the hub member in turn is fastened rigidly in any suitable manner to the shaft 11 as at 17 and its fastening is augmented by a bolt 18 passing through the hub and through the shaft.

Said plate 14 is made of resilient sheet metal and it has inclined peripheral portions at 19 and 20, corresponding to those at 12 and 13 respectively, and rendering its periphery of V-shape. Such plate 14 at suitable intervals is cut or slit radially inwardly from the periphery as at 21, and each portion thus provided has a struck-out rib or the like 22 serving to increase the resilience of the portion and provide a line on which the portion hinges or flexes. Preferably each portion 19 and 20 is lined with the usual facing material as at 29, riveted in place at 30. Normally however the resilient action of the plate maintains the lining 29 expanded and in contact with the surfaces 12 and 13.

Each peripheral portion of the clutch plate 14 divided or separated by slots 21 has a rigid depending arm 24 provided with webs 26 conforming in angularity to the portions 19 and 20, fitting against the same and being secured rigidly thereto by the rivets 30. The arms 24 have longitudinally extending terminal lugs 27 arranged in the path of movement of a clutch release bearing 28 of conventional form, slidably mounted on the shaft 11, being normally retracted as shown in Figure 1 but depressible against the lugs 27 to disengage the clutch, upon depression of the clutch pedal of the automobile or vehicle.

The clutch is shown engaged or applied, which is its normal condition, in Figure 1. In order to release the clutch the operator depresses the clutch pedal of the vehicle (not shown), which slides the conventional clutch bearing 28 into contact with the lugs 27 of arms 24. Continued sliding movement of the clutch bearing tilts the arms 24, causing them to disengage the lining 29 on the surfaces of 12 and 13, since the marginal clutch portions of the plate 14 hinge at the ribs 22, thus contracting the plate 14. However, when engaging the clutch, the operator slowly releases the said clutch pedal and the spring action of the plate 14 will restore it to normal position with the lining 29, effecting the clutch engagement with the surfaces 12 and 13.

It will be realized that the clutch plate 14 is substantially an integral part or rigid unit avoiding moving elements and especially the use of springs, bolts, collars, and pins; requires no adjusting and cannot wobble or wear, thus eliminating play or backlash, is air-cooled and will not squeak, chatter, or jerk, but will give a smooth operation, adding to the life of the linings and eliminating stripped gears or broken axle shafts due to sudden jerks.

Furthermore, the improved clutch is very light in weight and well adapted for use on aircraft or other machinery where disengagement of power is necessary. Also its smooth operation is attributable to a great extent to the portions having two toes and one heel per section.

Various changes may be resorted to provided that they fall within the spirit and scope of the invention.

I claim as my invention:

1. A clutch comprising inner and outer co-efficient members, the inner member consisting of a flexible plate provided with a peripheral portion adapted to engage the inner side of the outer member, said peripheral portion being formed with transverse slots dividing the same into segments, said slots extending radially into the plate whereby to weaken the plate and permit flexibility thereof, and means operative against the said inner member adapted to flex the same in order to effect a disengagement of the peripheral portion from the outer member.

2. A clutch comprising inner and outer coefficient members, the inner member consisting of a flexible plate provided with a peripheral portion adapted to engage the inner side of the outer member, said peripheral portion being formed with transverse slots dividing the same into segments, said slots extending radially into the plate whereby to weaken the plate and permit flexibility thereof, and means operative against the said inner member adapted to flex the same in order to effect a disengagement of the peripheral portion from the outer member, said plate being formed with a continuous corrugation, said plate being formed with enlarged openings at points on the corrugation and into which the said slots extend.

3. A clutch comprising inner and outer coefficient members, the inner member consisting of a flexible plate provided with a peripheral portion adapted to engage the inner side of the outer member, said peripheral portion being formed with transverse slots dividing the same into segments, said slots extending radially into the plate whereby to weaken the plate and permit flexibility thereof, and means operative against the said inner member adapted to flex the same in order to effect a disengagement of the peripheral portion from the outer member, the sections of said peripheral portion being provided with inwardly disposed arms, said means being operative against the arms to flex the said segment.

4. A clutch comprising inner and outer coefficient members, the inner member consisting of a flexible plate provided with a peripheral portion adapted to engage the inner side of the outer member, said peripheral portion being formed with transverse slots dividing the same into segments, said slots extending radially into the plate whereby to weaken the plate and permit flexibility thereof, and means operative against the said inner member adapted to flex the same in order to effect a disengagement of the peripheral portion from the outer member, the sections of said peripheral portion being provided with inwardly disposed arms, said means being operative against the arms to flex the said segment, said arms being formed with laterally disposed portions, a shaft on which the plate is splined, said shaft being provided with an abutment adapted to engage the laterally disposed portions of the arms to effect flexation of the segment and disengagement from the complemental outer clutch member.

J. EDWARD KOSTUR.